United States Patent
Masubuchi

(10) Patent No.: US 6,476,129 B2
(45) Date of Patent: Nov. 5, 2002

(54) THERMOPLASTIC ELASTOMER COMPOSITION WITH SUPERIOR OIL RESISTANCE

(75) Inventor: Tetsuo Masubuchi, Kawasaki (JP)

(73) Assignees: Asahi Kasei Kogyo Kabushiki Kaisha, Tokyo (JP); Optatech Corporation, Espoo (FI)

( * ) Notice: Subject to any disclaimer, the term of this patent is extended or adjusted under 35 U.S.C. 154(b) by 0 days.

(21) Appl. No.: 09/085,354

(22) Filed: May 27, 1998

(65) Prior Publication Data

US 2002/0004558 A1 Jan. 10, 2002

(30) Foreign Application Priority Data

Nov. 28, 1997 (JP) .............................. 9-328871

(51) Int. Cl.[7] .......................... C08K 5/01; C08L 23/04; C08L 25/10
(52) U.S. Cl. .............................. 525/71; 525/93; 525/95; 525/98; 525/309; 525/310; 524/504; 524/505
(58) Field of Search .............................. 525/93, 95, 98, 525/309, 310; 524/504, 505

(56) References Cited

U.S. PATENT DOCUMENTS

| | | | |
|---|---|---|---|
| 3,333,024 A | | 7/1967 | Haefele .................... 260/880 |
| 3,830,767 A | | 8/1974 | Condon .................. 260/28.5 B |
| 4,006,116 A | | 2/1977 | Dominguez .......... 260/33.6 AQ |
| 5,260,366 A | * | 11/1993 | Mitsuno et al. ............. 524/426 |
| 5,391,607 A | * | 2/1995 | Fujii et al. .................. 524/449 |
| 5,948,557 A | * | 9/1999 | Ondeck et al. ............... 521/64 |

FOREIGN PATENT DOCUMENTS

| | | |
|---|---|---|
| CA | 815575 | 6/1969 |
| EP | 0 418 861 A2 | 3/1991 |
| EP | 0 476 960 A1 | 3/1992 |
| EP | 0 520 515 A2 | 12/1992 |
| EP | 0 765 914 A1 | 4/1997 |
| EP | 0 770 645 A2 | 5/1997 |
| EP | 0 810 262 A1 | 12/1997 |
| FI | 920359 | 1/1992 |
| FI | 946055 | 6/1996 |
| FI | 951904 | 10/1996 |
| GB | 2 210 047 A | 6/1989 |
| JP | 50-14742 | 2/1975 |
| JP | 52-65551 | 5/1977 |
| JP | 58-132032 | 8/1983 |
| JP | 58-145751 | 8/1983 |
| JP | 59-53548 | 3/1984 |
| JP | 59-131613 | 7/1984 |
| JP | 62-48757 | 3/1987 |
| WO | 96/12745 | 5/1996 |
| WO | 97/06213 | 2/1997 |

OTHER PUBLICATIONS

Moritani et al., translation of JP06–122795, May 1994.*

* cited by examiner

Primary Examiner—Jeffrey Mullis
(74) Attorney, Agent, or Firm—Cohen, Pontani, Lieberman & Pavane

(57) ABSTRACT

The present invention relates to a novel thermoplastic elastomer composition with superior oil resistance along with elastomeric flexibility, creep resistance at high temperature, superior mechanical strength and moldability. The composition comprises (a) 100 parts by weight of a hydrogenated block copolymer obtained by hydrogenating a block copolymer comprising at least two A polymer blocks comprised mainly of a vinyl aromatic compound and at least one B polymer block comprised mainly of a conjugated diene compound; and (b) 30–300 parts by weight of a partially crosslinked thermoplastic elastomer obtained by polymerizing an acrylate monomer absorbed in a polyolefin. The novel composition can be applied as a material for various molded parts.

5 Claims, No Drawings

THERMOPLASTIC ELASTOMER COMPOSITION WITH SUPERIOR OIL RESISTANCE

BACKGROUND OF THE INVENTION

1. Field of the Invention

The present invention relates to a novel thermoplastic elastomer composition with superior oil resistance along with elastomeric flexibility, creep resistance at high temperature, superior mechanical strength and moldability. The invented composition can be applied as a material for various molded parts.

2. Background Art

Recently, thermoplastic elastomer has been widely used in various fields such as automobile, electric appliances, wire and cables, medical goods, consumer products and footwear because it has rubber like elasticity without vulcanization and can be molded just like thermoplastics.

A typical example of the thermoplastic elastomer, a block copolymer of a vinyl aromatic compound and a conjugated diene compound, such as styrene-butadiene-styrene block copolymer, however, is inferior in heat resistance, weather resistance and oil resistance, which have limited application fields.

In order to improve these properties, many compositions have been proposed such as a composition between hydrogenated vinyl aromatic-conjugate diene block copolymer and polyolefin as described in Japanese Laid-open Patent Application Specifications Nos. Sho 50-14742 and Sho 52-65551. These compositions have improved weather resistance and heat resistance, however, their oil resistance are still poor and equivalent to that of the above thermoplastic elastomer.

In order to improve the defect of oil resistance, a dynamic-vulcanization method with an organic peroxide for a composition made of a hydrogenated block copolymer, hydrocarbon oil, polyolefin and inorganic fillers are proposed as described in Japanese Laid-open Patent Application Specifications Nos. Sho 58-13203, Sho 58-145751, Sho 59-53548, Sho 59-131613 and Sho 62-48757. These compositions have improved elasticity at high temperature, however, organic peroxide included in the composition may often cause polymer chain scission which lowers mechanical strength of the composition and oil resistance itself is not necessarily enough.

SUMMARY OF THE INVENTION

In these situations, the inventors have made extensive and intensive studies in order to develop a thermoplastic elastomer composition, which not only has superior flexibility, weather and heat resistance, low temperature properties, mechanical strength, moldability typical of hydrogenated block copolymer but also exhibits excellent oil resistance. As a result, it has unexpectedly been found that, when a partially crosslinked thermoplastic elastomer composed of polyolefin and polyacrylate is blended to a hydrogenated block copolymer, the composition exhibits oil resistance equivalent to that of CR and has typical characteristics of the hydrogenated block copolymer itself.

The foregoing object, features and advantages of the present invention will be apparent to those skilled in the art from the appended claims and detailed description.

According to a first embodiment, the present invention comprises a thermoplastic elastomer composition obtainable by melt blending of a compound comprising:

(a) 100 parts by weight of a hydrogenated block copolymer obtained by hydrogenating a block copolymer comprising at least two A polymer blocks comprised mainly of a vinyl aromatic compound and at least one B polymer block comprised mainly of a conjugated diene compound; and (b) 30–300 parts by weight of a partially crosslinked thermoplastic elastomer obtained by polymerizing an acrylate monomer absorbed in a polyolefin.

According to another embodiment, the invention comprises a thermoplastic elastomer composition obtainable by melt blending of a compound comprising:

(a) 100 parts by weight of a hydrogenated block copolymer obtained by hydrogenating a block copolymer comprising at least two A polymer blocks comprised mainly of a vinyl aromatic compound and at least one B polymer block comprised mainly of a conjugated diene compound;

(b) 30–300 parts by weight of a partially crosslinked thermoplastic elastomer obtained by polymerizing an acrylate monomer absorbed in a polyolefin.

(c) 40–300 parts by weight of non-aromatic rubber use oil; and (d) 5–70 parts by weight of polyolefin resin.

Preferably, in a thermoplastic elastomer composition according to the first or second embodiment above, said vinyl aromatic compound is styrene and the said conjugated diene compound is butadiene or isoprene.

Further, in a thermoplastic elastomer composition according to the second embodiment above, said polyolefin resin is a propylene homopolymer and/or a copolymer of propylene with ethylene or $C_4$–$C_8$ α-olefin.

In a thermoplastic elastomer composition according to the second embodiment above, said non-aromatic rubber use oil is a oil with kinematic viscosity of 20–800 cSt at 40° C., fluidity point of 0 to −40° C. and flash point of 200–400° C.

DETAILED DESCRIPTION OF THE INVENTION

For easy understanding of the present invention, the essential features and various embodiments of the present invention are enumerated below.

Examples of a vinyl aromatic compound contained in the hydrogenated block copolymer as a (a) component include styrene, α-methylstyrene, vinyltoluene, p-tert-butylstyrene and the like. They can be used individually and in combination. Among these compounds, styrene is preferred.

Examples of a conjugated diene compound include butadiene, isoprene, 1,3-pentadiene, 2,3-dimethyl-1,3-butadiene and the like. They can be used individually and in combination. Among these compounds, butadiene, isoprene and their combination are preferred. Microstructure of B polymer block before hydrogenation can be arbitrarily selected. For example, in the case of polybutadiene block, the content of 1,2-vinyl bond in the block is preferably from 20 to 50%, more preferably 25 to 45%. In the case of polyisoprene block, the content of 1,4 bond in the block is preferably more than 80%, more preferably more than 90%.

As mentioned above, the structure of the block copolymer before the hydrogenation, is comprised of at least two A polymer blocks comprised mainly of a vinyl aromatic compound and at least one B polymer block comprised mainly of a conjugated diene compound. Examples of the block structure include A—B—A, B—A—B—A, A—B—A—B—A, $(A-B)_4$—Si, $(B-A-B)_4$—Si, $(B-A-B)_4$—Sn and the like.

The term "comprised mainly of" used herein in connection with the polymer block means that 50% by weight or more, preferably 70% by weight or more of all monomer units constituting the polymer block are specified monomer units which are main constituents for the respective polymer block. As examples of the remaining monomer units for each of A and B polymer blocks, there should be mentioned conjugated diene and vinyl aromatic compounds can be arranged in random, tapered, block structure or any combination of them. The term "tapered" structure means that the concentration of certain monomer units contained in the polymer block increasingly or decreasingly changes along the polymer chain. With respect to each of the polymer blocks A and B, when the number of the blocks contained before the hydrogenation is two or more, the structures of the blocks may be the same or different.

In the present invention, the hydrogenated block copolymer has a number average molecular weight of from 30,000 to 800,000, preferably from 50,000 to 500,000, and still more preferably from 100,000 to 400,000. When the number average molecular weight of the hydrogenated block copolymer is less than 30,000, mechanical strength and heat resistance of the thermoplastic elastomer composition are disadvantageously lowered. On the other hand, when the number average molecular weight of the hydrogenated block copolymer is more than 800,000, moldability (fluidity) of the thermoplastic elastomer composition becomes low and so surface appearance of the molded articles disadvantageously becomes poor (flow marks occur).

The hydrogenated block copolymer contains A blocks in an amount of from 10 to 45% by weight, preferably from 20 to 40% by weight. When the amount of A blocks is less than 10% by weight, mechanical strength and heat resistance of the thermoplastic elastomer composition are disadvantageously lowered. On the other hand, when the amount of A blocks is more than 45% by weight, elastomeric flexibility and low temperature properties of the thermoplastic elastomer composition disadvantageously become poor.

The molecular weight distribution (MWD), which is given as a ratio of weight average molecular weight to number average molecular weight, of the hydrogenated block copolymer is preferably not more than 5, more preferably not more than 2, still more preferably not more than 1.5. When the MWD is more than 5, mechanical strength and heat resistance of the thermoplastic elastomer composition are unsatisfactory.

The molecular weight and MWD described in this invention are determined with GPC (Gel Permeation Chromatography), for example, using a calibration curve obtained with standard polystyrenes.

With respect to a production method of the hydrogenated block copolymer, any method can be used as long as the block structure described in this invention is obtained. For example, the desired hydrogenated block copolymer can be obtained by hydrogenating a vinyl aromatic compound conjugated diene compound block copolymer which is synthesized using a lithium catalyst in an inert medium by the method described in Japanese Published Patent Specification No. Sho 40-23798. Examples of the hydrogenation method are described such as in Japanese Published Patents Specifications Nos. Sho 42-8704 and 43-6636 and U.S. Pat. Nos. 3,644,588 and 3,431,323.

The hydrogenation degree of the double bond of the conjugated diene compound moiety is preferably 80% or more, more preferably 90% or more. On the other hand, the hydrogenation degree of the double bond of the vinyl aromatic compound is preferably less than 20%, more preferably less than 10%. The hydrogenation degree of the obtained hydrogenated block copolymer can be easily known with infrared spectroscopy or NMR.

The production method of a partially crosslinked thermoplastic elastomer as a (b) component of this invention is described in detail in FI Patent Applications Nos. 894461, 904586, 920359, 931863, 946055, 951904 and 953803.

Examples of a polyolefin used for making component (b) include homo- or copolymer of ethylene and propylene or a blend of two or more polyolefins. A comonomer for ethylene polymer can be vinyl acetate, vinyl chloride, propylene or some other $\alpha$-olefin, $C_1$–$C_7$alkyl(meth)acrylate, (meth) acrylic acid, hydroxy alkyl(meth)acrylate, glycidyl(meth) acrylate, dienes such as hexadiene-1,4, hexadiene-1,5, hexadiene-1,6, 2-methyl-pentadiene-1,4, octadiene-1,7, 6-methylheptadiene-1,5, and polyenes such as octatriene and dicyclopentadiene.

Also ethylene- $\alpha$-olefin-polyene terpolymers can be used. Useful $\alpha$-olefins include propylene, butene, pentene, isoprene, hexene or their mixtures and useful polyenes include hexadiene-1,4, hexadiene-1,5, hexadiene-1,6,2-methyl-pentadiene-1,4, octadiene-1,7, 6-methylheptadiene-1,5, octatriene, dicyclopentadiene. In case that ethylene polymer is a copolymer, the content of ethylene must be at least 50% by weight.

Propylene copolymers must consist over 50% by weight propylene and can be random- or block copolymer of propylene and ethylene or also other $\alpha$-olefin can be used as comonomers, like dienes such as hexadiene-1,4, hexadiene-1,5, hexadiene- 1,6, 2-methylpentadiene-1,4, octadiene-1,7, 6-methylheptadiene-1,5, and polyenes such as octatriene and dicyclopentadiene.

As functional polyolefin, polyolefin grafted with maleic acid anhydride, (meth)acrylic acid and glycidyl(meth) acrylate can be used.

Suitable acrylate monomers used for making component (b) of this invention are (meth)acrylates whose polymer have low glass transition temperature, i.e. they are rubber like at room temperature and low temperature, preferably below –20° C. Suitable acrylates are alkylacrylates having 1 or preferably 2 or more carbon atoms in the alkyl chain. Methacrylates having a glass temperature low enough are alkyl-methacrylates having 4 or more, preferably 8 or more carbon atoms in the alkyl chain. These monomers can be used alone or in mixtures of two or more monomers.

Together with the above mentioned monomers, smaller amounts of monomers having less carbon atoms in the carbon chain can also be used. Glass transition temperature of the final products can thus be tailored. According to this invention, one or more functional monomers are added to the acrylate monomer. Typical functional monomers are: glycidyl methacrylate, 2-t-butylaminoethyl methacrylate, polypropyleneglycol monomethacrylate, and mono-methacryloyl-oxy-ethylphthalate.

Typically, the ratio between polyacrylate and polyolefin in the component (b) is 0.1–5, preferably 0.5–2.

The amount of (b), based on 100 parts by weight of (a), in this invention is 30–300 parts by weight, preferably 50–200 parts by weight. When the amount of (b) is more than 300 parts by weight, mechanical strength and heat resistance of the thermoplastic elastomer compound become disadvantageously lowered, although oil resistance is improved. On the other hand, when the amount of (b) is less than 30 parts by weight, oil resistance is not satisfactory.

Examples of non-aromatic oil described as a component (c) of this invention, include a non-aromatic mineral oil, such as conventional paraffinic and naphthenic oil and a liquid or low molecular weight synthetic softening agent.

Aromatic oils are not suitable because they may partially dissolve component (a) of this invention and consequently lower mechanical strength of the invented composition. Preferable examples are paraffinic oils and more preferably paraffinic oils containing less aromatic ring compounds.

The amount of a component (c) of this invention relative to 100 parts by weight of a component (a) of this invention is 40–300, preferably 80–200. When the amount is more than 300 parts by weight, the oil may bleed out, and thus giving final products stickiness and also disadvantageously lowers mechanical strength of the thermoplastic elastomer composition. On the other hand, when the amount is less than 40 parts by weight, elastic flexibility of the thermoplastic elastomer composition is not sufficient.

Examples of polyolefin described as a component (d) of this invention, include polyethylene based and polypropylene based resins.

Examples of the polyethylene based resins are LDPE, LLDPE, HDPE and copolymers of ethylene with $C_3$–$C_8$ α-olefin such as propylene, 1-butene, isobutene, 1-pentene, 1-hexene, 4-methyl-1-pentene, 1-octene and the like. The content of the α-olefin in the copolymer is preferably 30% by weight or less.

Examples of the polypropylene based resins are propylene homopolymer and random and block copolymers of propylene with ethylene and $C_4$–$C_8$ α-olefin such as 1-butene, isobutene, 1-pentene, 1-hexene, 4-methyl-1-pentene, 1-octene and the like. The content of the α-olefin in the copolymer is preferably 30% by weight or less. These polypropylene based resins can be produced by any conventional methods such as by using Ziegler-Natta catalysts.

In order to obtain the thermoplastic elastomer composition with superior heat resistance and moldability, the polypropylene based resins are preferable as a component (d) of this invention.

Melt flow rate, (herein after referred to as MFR, measured at 230° C., 2.16 kg load as specified in ASTM D1238) of the polyolefin component (d) is 1–60 g/10 min., preferably 5–40 g/10 min. When MFR of the component (d) is less than 1 g/10 min, melt viscosity of the thermoplastic elastomer composition increase, resulting in poor moldability (fluidity) and poor surface appearance (flow marks occur) of the molded parts. On the other hand, when MFR of the component (d) is more than 60 g/10 min., mechanical strength and heat resistance of the thermoplastic elastomer composition are disadvantageously lowered.

The amount of the polyolefin component (d) of the thermoplastic elastomer composition, relative to 100 parts by weight of the component (a), is 5–60 parts by weight, preferably 10–50 parts by weight. When the amount of (d) is less than 5 parts by weight, heat resistance and moldability of the thermoplastic elastomer composition are disadvantageously lowered. On the other hand, when the amount of the component (d) is more than 60 parts by weight, elastic flexibility of the thermoplastic elastomer composition is disadvantageously lowered.

As component other than (a), (b), (c), and (d), of the thermoplastic elastomer composition of this invention, the following known additive, thermoplastic resin, elastomer and filler, depending on applications. as long as the object of the invention is satisfied.

Examples of the additives include antioxidant, heat stabilizer, light stabilizer, UV absorber, neutralizer, lubricant, antifogging agent, antiblocking agent, dispersant, colorant, flame retardant, antistatic agent, conducting filler, crosslinking agent, crosslinking co-agent, chain transfer agent, antimicrobe agent, fluorescent whitening agent and the like.

Examples of the thermoplastic resin include EVA, ethylene-(meth)acrylic acid copolymer, ethylene-(meth) acrylate copolymer, polyphenylene ether, nylon 6, nylon 66, PET, PBT, oxymethylene homo- and copolymer and the like.

Examples of the elastomer include EPM, EPDM, ethylene-butene copolymer, ethylene-propylene-butene copolymer, rubber such as SBR, SIR and PBR and the like.

Examples of the filler include glass fiber, hollow glass bead, carbon fiber, talc, calcium carbonate, mica, calcium titanate fiber, silica, titania, carbon black and the like.

In producing the thermoplastic elastomer composition of the present invention, the components for the composition can be blended by a known method. For obtaining the thermoplastic elastomer composition in the most homogeneous form, it is preferred that the above mentioned components are dry-blended, prior to melt-kneading, using a mixer, such as a Henschel mixer, a tumbler, a ribbon blender or the like, followed by melt kneading using a conventional kneader, such as a mixing roll, a kneader, a Banbury mixer, an extruder or the like.

BEST MODE FOR CARRYING OUT THE INVENTION

Herein below, the present invention will be described in more detail with the following examples and comparative examples, which should. however, not be construed as limiting the scope of the present invention. In the following examples and comparative examples, various properties were measured by the following methods.

(1) MFR (g/10 min.):

ASTM D1238, at 230° C., 2.16 kg load (2) Hardness:

JIS K6301, A type spring, at 23° C.

Dumbbell No. 3 type test specimens are cut off from a compression molded sheet with thickness of 2 mm and four specimens are piled up for the test.

(3) Tensile Strength (MPa) and elongation at break (%):

JIS K6301, at 23° C.

Dumbbell No. 3 type test specimens are cut off from a compression molded sheet with thickness of 2 mm.

(4) Compression Set(%):

JIS K6301, 70° C.×22 hr. Initial compression ratio of 25%. Disk-shaped test specimens are cut off from a compression molded sheet with thickness of 2 mm and piled up to the specified thickness.

(5) Oil Resistance(%):

JIS K6301, 70° C.×166 hr. Test specimens are cut off from a compression molded sheet with thickness of 2 mm and immersed into JIS No. one and three type oils. Weight increase and retention ratio of tensile strength were measured relative to those before the test.

The components used in examples and comparative examples are described below.

Component (a): All of the following four components (a-1)-(a4) were polymerized and hydrogenated by the method described in Japanese Laid-open Patent Specification No. Sho 60–220147. Their molecular structures before and after the hydrogenation are shown below:

|  | (a-1) | (a-2) | (a-3) | (a-4) |
|---|---|---|---|---|
| Block structure | A-B-A | A-B-A | A-B-A | A-B-A |
| A | styrene | styrene | styrene | styrene |
| B | BD | BD | BD | IP |
|  | (BD = butadiene) |  | (IP = isoprene) |  |
| Styrene content (wt %) | 33 | 33 | 30 | 28 |
| 1,2 and 3,4bond (%) | 35 | 35 | 35 | 6 |
| Degree of Hydrogenation (%) | 99 | 99 | 99 | 99 |
| $M_n$ (×10,000) | 16 | 7 | 25 | 17 |
| MWD | 1.15 | 1.15 | 1.17 | 1.10 |

Component (b) "PACREL 631", a thermoplastic vulcanisate composed of 60% crosslinked polybutylacrylate as the dispersed phase and 40% polypropylene as the continuous phase produced by OPTATECH CORP., Finland. Density is 0.996 g/cm$^3$, hardness 90, tensile strength 6.7 MPa, elongation 86%.

Component (c): "Diana Process Oil PW-380", paraffinic oil produced by Idemitsu Kosan Co., Ltd., Japan. Kinematic viscosity at 40° C. is 382 cSt.

Component (d): "M-1600", polypropylene produced by Japan Polyolefin Co., Ltd. MFR 15 g/10 min.

Examples 1–19

Comparative Examples 1–5

Total components, shown in Table 1, and 0,1 parts by weight of "Irganox 1076", a phenol based stabilizer, relative to 100 parts by weight of the total components, were melt kneaded using a 45 mm φ twin screw extruder at 220° C. to thereby obtain pellets of the thermoplastic elastomer composition. The pellets were then compression molded at 200° C., 100 kg/cm$^2$ to furnish test pieces for the above described evaluation. The evaluation results are summarized in Tables 1 to 8.

TABLE 1

|  |  | Example 1 | Example 2 | Example 3 |
|---|---|---|---|---|
| Weight ratio (parts by weight) | Component (a-1) Hydrogenated block copolymer | 100 | 100 | 100 |
|  | Component (b) PACREL 631 | 70 | 135 | 200 |
|  | Component (c) Paraffinic oil | — | — | — |
|  | Component (d) Polypropylene | — | — | — |
| Physical properties | Hardness (JIS A) | 73 | 78 | 82 |
|  | MFR (g/10 min) | 1.5 | 1.8 | 2.1 |
|  | Tensile strength (MPa) | 15.3 | 12.8 | 9.0 |
|  | Elongation at breakage (%) | 400 | 350 | 310 |
|  | Compression set (%) | 45 | 50 | 60 |
| JIS NO. 1 Oil Resistance | Weight increase (%) | 12 | 8 | 6 |
|  | Retention of tensile strength (%) | 82 | 90 | 96 |
| JIS NO. 3 Oil Resistance | Weight increase (%) | 50 | 40 | 35 |
|  | Retention of tensile strength (%) | 72 | 80 | 85 |

TABLE 2

|  |  | Example 4 | Example 5 | Example 6 |
|---|---|---|---|---|
| Weight ratio (parts by weight) | Component (a-1) Hydrogenated block copolymer | 100 | 100 | 100 |
|  | Component (b) PACREL 631 | 70 | 70 | 160 |
|  | Component (c) Paraffinic oil | 140 | 140 | 140 |
|  | Component (d) Polypropylene | 50 | 30 | 10 |
| Physical properties | Hardness (JIS A) | 73 | 67 | 75 |
|  | MFR (g/10 min) | 5.0 | 3.2 | 2.6 |
|  | Tensile strength (MPa) | 9.8 | 9.1 | 8.3 |
|  | Elongation at breakage (%) | 760 | 800 | 710 |
|  | Compression set (%) | 45 | 47 | 52 |
| JIS NO. 1 Oil Resistance | Weight increase (%) | 16 | 18 | 10 |
|  | Retention of tensile strength (%) | 73 | 70 | 83 |
| JIS NO. 3 Oil Resistance | Weight increase (%) | 58 | 65 | 48 |
|  | Retention of tensile strength (%) | 56 | 52 | 65 |

TABLE 3

|  |  | Example 7 | Example 8 | Example 9 |
|---|---|---|---|---|
| Weight ratio (parts by weight) | Component (a-1) Hydrogenated block copolymer | 100 | 100 | 100 |
|  | Component (b) PACREL 631 | 160 | 160 | 160 |
|  | Component (c) Paraffinic oil | 140 | 140 | 80 |
|  | Component (d) Polypropylene | 30 | 50 | 30 |
| Physical properties | Hardness (JIS A) | 78 | 82 | 85 |
|  | MFR (g/10 min) | 4.0 | 4.5 | 3.2 |
|  | Tensile strength (MPa) | 10.5 | 12.6 | 13.9 |
|  | Elongation at breakage (%) | 640 | 650 | 630 |
|  | Compression set (%) | 53 | 58 | 58 |
| JIS NO. 1 Oil Resistance | Weight increase (%) | 7 | 8 | 7 |
|  | Retention of tensile strength (%) | 85 | 92 | 88 |
| JIS NO. 3 Oil Resistance | Weight increase (%) | 45 | 41 | 49 |
|  | Retention of tensile strength (%) | 55 | 69 | 53 |

TABLE 4

|  |  | Example 10 | Example 11 | Example 12 |
|---|---|---|---|---|
| Weight ratio (parts by weight) | Component (a-1) Hydrogenated block copolymer | 100 | 100 | 100 |
|  | Component (b) PACREL 631 | 160 | 240 | 240 |
|  | Component (c) Paraffinic oil | 200 | 120 | 90 |

TABLE 4-continued

|  |  | Example 10 | Example 11 | Example 12 |
|---|---|---|---|---|
|  | Component (d) Polypropylene | 30 | 20 | 50 |
| Physical properties | Hardness (JIS A) | 68 | 80 | 88 |
|  | MFR (g/10 min) | 6.0 | 3.5 | 2.8 |
|  | Tensile strength (MPa) | 8.9 | 6.0 | 5.5 |
|  | Elongation at breakage (%) | 700 | 690 | 590 |
|  | Compression set (%) | 55 | 63 | 67 |
| JIS NO. 1 Oil Resistance | Weight increase (%) | 11 | 85 | 6 |
|  | Retention of tensile strength (%) | 75 | 86 | 90 |
| JIS NO. 3 Oil Resistance | Weight increase (%) | 43 | 35 | 38 |
|  | Retention of tensile strength (%) | 58 | 69 | 72 |

TABLE 5

|  |  | Example 13 | Example 14 | Example 15 |
|---|---|---|---|---|
| Weight ratio (parts by weight) | Component (a) Hydrogenated block copolymer | (a-1) 100 | (a-2) 100 | (a-3) 100 |
|  | Component (b) PACREL 631 | 240 | 135 | 135 |
|  | Component (c) Paraffinic oil | 200 | — | — |
|  | Component (d) Polypropylene | 20 | — | — |
| Physical properties | Hardness (JIS A) | 74 | 75 | 80 |
|  | MFR (g/10 min) | 5.0 | 3.0 | 0.5 |
|  | Tensile strength (MPa) | 5.3 | 9.0 | 18.3 |
|  | Elongation at breakage (%) | 680 | 300 | 400 |
|  | Compression set (%) | 67 | 67 | 60 |
| JIS NO. 1 Oil Resistance | Weight increase (%) | 11 | 18 | 5 |
|  | Retention of tensile strength (%) | 84 | 65 | 95 |
| JIS NO. 3 Oil Resistance | Weight increase (%) | 45 | 58 | 35 |
|  | Retention of tensile strength (%) | 63 | 51 | 88 |

TABLE 6

|  |  | Example 16 | Example 17 | Example 18 |
|---|---|---|---|---|
| Weight ratio (parts by weight) | Component (a) Hydrogenated block copolymer | (a-4) 100 | (a-2) 100 | (a-3) 100 |
|  | Component (b) PACREL 631 | 135 | 160 | 160 |
|  | Component (c) Paraffinic oil | — | 140 | 140 |
|  | Component (d) Polypropylene | — | 30 | 30 |
| Physical properties | Hardness (JIS A) | 78 | 74 | 80 |
|  | MFR (g/10 min) | 1.6 | 7.0 | 2.5 |
|  | Tensile strength (MPa) | 10.0 | 5.9 | 13.6 |
|  | Elongation at breakage (%) | 310 | 650 | 750 |
|  | Compression set (%) | 55 | 66 | 47 |
| JIS NO. 1 Oil Resistance | Weight increase (%) | 15 | 19 | 7 |
|  | Retention of tensile strength (%) | 72 | 62 | 95 |
| JIS NO. 3 Oil Resistance | Weight increase (%) | 48 | 62 | 38 |
|  | Retention of tensile strength (%) | 69 | 52 | 75 |

TABLE 7

|  |  | Example 19 |
|---|---|---|
| Weight ratio (parts by weight) | Component (a) Hydrogenated block copolymer | (a-4) 100 |
|  | Component (b) PACREL 631 | 160 |
|  | Component (c) Paraffinic oil | 140 |
|  | Component (d) Polypropylene | 30 |
| Physical properties | Hardness (JIS A) | 79 |
|  | MFR (g/10 min) | 3.7 |
|  | Tensile strength (MPa) | 8.8 |
|  | Elongation at breakage (%) | 610 |
|  | Compression set (%) | 56 |
| JIS NO. 1 Oil Resistance | Weight increase (%) | 13 |
|  | Retention of tensile strength (%) | 70 |
| JIS NO. 3 Oil Resistance | Weight increase (%) | 57 |
|  | Retention of tensile strength (%) | 50 |

TABLE 8

|  |  | Comparative Example 1 | Comparative Example 2 |
|---|---|---|---|
| Weight ratio (parts by weight) | Component (a-1) Hydrogenated block copolymer | 100 | 100 |
|  | Component (b) PACREL 631 | — | 350 |
|  | Component (c) Paraffinic oil | 140 | 140 |
|  | Component (d) Polypropylene | 30 | 30 |
| Physical properties | Hardness (JIS A) | 57 | 88 |
|  | MFR (g/10 min) | 3.0 | 2.8 |
|  | Tensile strength (MPa) | 15.0 | 4.5 |
|  | Elongation at breakage (%) | 900 | 210 |
|  | Compression set (%) | 42 | 75 |
| JIS NO. 1 Oil | Weight increase (%) | 60 | 5 |

TABLE 8-continued

|  |  | Comparative Example 1 | Comparative Example 2 |
|---|---|---|---|
| Resistance | Retention of tensile strength (%) | 45 | 97 |
| JIS NO. 3 Oil | Weight increase (%) | 200 | 26 |
| Resistance | Retention of tensile strength (%) | — | 84 |

Industrial Applicability

The thermoplastic elastomer composition of this invention has superior oil resistance along with practically enough level of mechanical strength, heat resistance and moldability. Therefore it is useful in various fields including automobile parts.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

What is claimed is:

1. A thermoplastic elastomer composition obtained by melt blending a compound comprising:

(a) 100 parts by weight of a hydrogenated block copolymer obtained by hydrogenating a block copolymer comprising at least two A polymer blocks comprised of at least 50 wt-% of vinyl aromatic compound and at least one B polymer block comprised of at least 50 wt-% of a conjugated diene compound;

(b) 30–300 parts by weight of a partially crosslinked thermoplastic elastomer obtained by polymerizing an acrylate monomer absorbed in a polyolefin;

(c) 40–300 parts by weight of non-aromatic oil; and (d) 5–70 parts by weight of polyolefin resin.

2. The thermoplastic elastomer composition of claim 1, wherein said polyolefin resin is a propylene homopolymer and/or a copolymer of propylene with ethylene or $C_4$–$C_8$ α-olefin.

3. The thermoplastic elastomer composition of claim 1, wherein said non-aromatic oil has a dynamic viscosity at 40° C. of 20 to 800cSt, fluidity point of 0 to −40° C. and a flash point of 200 to 400° C.

4. The thermoplastic elastomer of claim 1, wherein said vinyl aromatic compound is styrene and said conjugated diene compound is butadiene or isoprene.

5. The thermoplastic elastomer composition of claim 1, wherein the at least two A polymer blocks comprises at least 70 wt.% of vinyl aromatic compound.

* * * * *